(12) United States Patent
Reichenbach et al.

(10) Patent No.: US 7,388,984 B2
(45) Date of Patent: Jun. 17, 2008

(54) METHOD OF RECOGNIZING A CODE

(75) Inventors: Juergen Reichenbach, Emmendingen (DE); Christiane Stortz, Schutterwald (DE); Carl Joseph Hafner, Emmendingen (DE); Peter Hauser, Freiburg (DE)

(73) Assignee: Sick AG, Waldkirch (DE)

( * ) Notice: Subject to any disclaimer, the term of this patent is extended or adjusted under 35 U.S.C. 154(b) by 901 days.

(21) Appl. No.: 10/230,634

(22) Filed: Aug. 28, 2002

(65) Prior Publication Data

US 2003/0072489 A1 Apr. 17, 2003

(30) Foreign Application Priority Data

Aug. 28, 2001 (DE) ................................. 101 41 876

(51) Int. Cl.
*G06K 9/00* (2006.01)
(52) U.S. Cl. .................. 382/181; 382/232; 235/494
(58) Field of Classification Search ................ 382/181, 382/209, 218–221, 226–228, 232–233, 308; 219/121.69; 235/462.09, 487, 494
See application file for complete search history.

(56) References Cited

U.S. PATENT DOCUMENTS

| 5,120,940 | A | * | 6/1992 | Willsie ............... 235/462.08 |
| 5,739,518 | A | | 4/1998 | Wang |
| 5,862,270 | A | | 1/1999 | Lopresti et al. |
| 5,999,653 | A | * | 12/1999 | Rucklidge et al. .......... 382/227 |
| 6,121,574 | A | * | 9/2000 | Xu ........................ 219/121.69 |
| 6,128,398 | A | * | 10/2000 | Kuperstein et al. ......... 382/118 |
| 6,244,764 | B1 | | 6/2001 | Lei et al. |
| 6,533,181 | B1 | * | 3/2003 | Roxby et al. ............... 235/494 |
| 6,668,097 | B1 | * | 12/2003 | Hu et al. .................... 382/275 |
| 6,941,026 | B1 | * | 9/2005 | Nadabar et al. ............ 382/265 |
| 2002/0153423 | A1 | * | 10/2002 | Schramm .................... 235/487 |

FOREIGN PATENT DOCUMENTS

| DE | 19722439 A1 | 12/1997 |
| EP | 0569962 A2 | 11/1993 |
| EP | 0785522 A2 | 7/1997 |
| WO | WO 01/53101 A1 | 7/2001 |

OTHER PUBLICATIONS

Bloomberg, D.S. et al.; "Blur Hit-Miss Transform and its use in document image pattern detection"; 1995, *SPIE*, vol. 2422, pp. 287-292.
"Fast Method for Performing Cellular Logic Operations on Binary Images"; 1994, *IBM Technical Disclosure Bulletin*, vol. 37, No. 4A, pp. 199-204.

* cited by examiner

*Primary Examiner*—Sheela C Chawan
(74) *Attorney, Agent, or Firm*—Townsend and Townsend and Crew, LLP

(57) ABSTRACT

The invention relates to a method of recognizing a code which is encoded inside an image data set which contains a piece of respective information on a gray scale value for each of a plurality of picture elements. At least one dilation operation and/or erosion operation is carried out on the image data set.

18 Claims, 2 Drawing Sheets

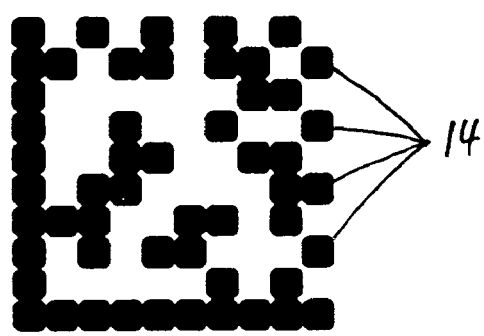
FIG.3a
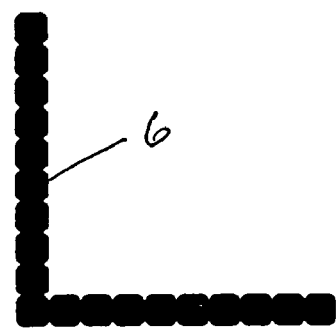
FIG.3b
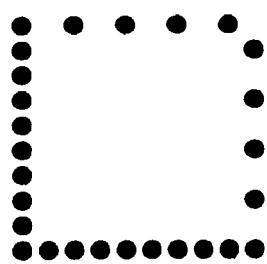
FIG.4a
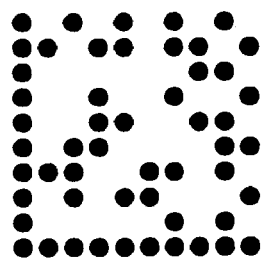
FIG.4b
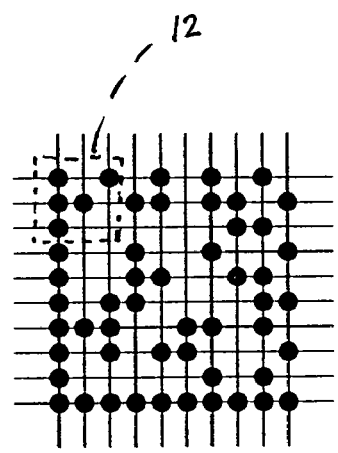
FIG.4c
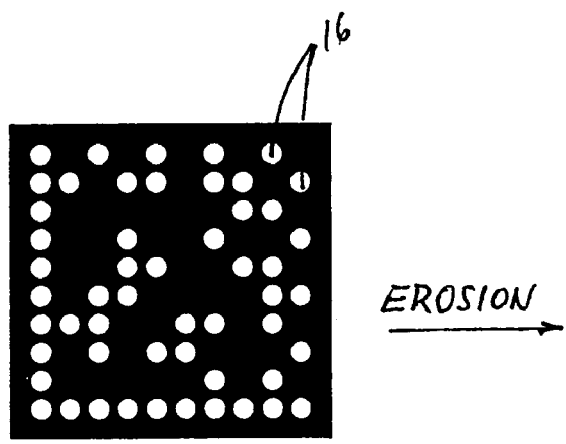
FIG.5a  EROSION →  FIG.5b

METHOD OF RECOGNIZING A CODE

BACKGROUND OF THE INVENTION

The invention relates to a method of recognizing a code which is encoded inside an image data set which contains a respective piece of information on a gray scale value for each of a plurality of picture elements.

Such codes exist as two-dimensional codes, for example of the kind Maxicode, Datamatrix, QR, PDF 417 or MicroPDF 417. One-dimensional codes, in particular so-called barcodes, have been known for quite some time.

These codes serve, for example, as visual data carriers on objects which should be identified or distinguished from one another. Such a code is usually detected by means of an optoelectronic sensor, for example a CCD or CMOS receiver, with a linear- or matrix-shaped arrangement of picture elements and converted into a piece of electronic image information which is available as an image data set. The gray scale value data which were determined for the individual picture elements of the sensor are listed in a tabular list in the image data set.

The image data set is initially examined as to the presence of a reference pattern which characterizes the arrangement of the code in question within the image information as well as the kind of code. The individual code elements of which the code is made up are identified on the basis of the identification of this reference pattern. A binarization then takes place for these code elements using a threshold formation; i.e. the gray scale value determined for a code element is allocated to the category "white" or to the category "black". The actual decoding takes place subsequent to these steps, and indeed using an algorithm corresponding to the identified code type.

For certain products, it is known to apply the code directly to the product by means of a stamping process as part of the so-called direct marking process. For this purpose, stamped openings, so-called dots, are introduced into a single color area, the dots contrasting with the single color background and thereby being intended to serve as code elements.

With poorly represented codes, in particular with codes which have been produced using the direct marking process, the risk can exist of a non-recognition or a defective recognition of the code.

SUMMARY OF THE INVENTION

It is an object of the invention to improve the recognition of codes with poor representation quality, in particular the recognition of codes which have been produced in the direct marking process.

This object is satisfied for a method of the kind initially named in that at least one dilation operation and/or erosion operation is carried out on the image data set.

With the invention, the determined image information is therefore modified—at least for some of the further processing and decoding steps—so that individual code elements, that is, dark and/or light regions of the code, are enlarged so that adjacent code elements can be recognized and interpreted as contiguous areas.

The invention thus provides the advantage that adjacent code elements which are—unintentionally—visually separated from one another can be recognized as contiguous. The problem is thereby avoided which occurs in particular with codes of the direct marketing process that, due to non-contiguous code element structures, the code in question, in particular its reference pattern, cannot be recognized at all.

The usual identification and decoding algorithms can be used—without the necessity of further modifications—due to the interposition of the dilation operation and/or the erosion operation into the further process steps of the code recognition. The invention is thus advantageously and simply integratable into existing software and hardware for code recognition.

It is preferred for the dilation operation and/or the erosion operation only to be carried out with respect to the identification of the reference pattern of the code in question. It has been recognized within the framework of the invention that possible false recognitions of codes of poor representation quality mainly occur in the process step of the identification of the position and of the code type. It can in particular be sufficient to carry out the dilation operation and/or the erosion operation only with respect to a part of the reference patterns, for example with respect to the so-called finder pattern of the code, as will still be explained in the following. It has, in contrast, been found that, after a successful identification of the reference pattern, a conventional decoding algorithm on the basis of the original image data set, that is, without an additional dilation or erosion operation, can work with a sufficiently low error rate.

The dilation and/or the erosion operation can be carried out before the start of the identification of the reference pattern. It is, however, preferred for the operation to take place along with the identification of the reference pattern of the code or with the identification of a part of the reference pattern, in that the dilation operation and/or the erosion operation is implicitly carried out. The required processing time and the required intermediate memory can be reduced if the gray scale values observed during the working through of an identification algorithm are only subjected to the dilation operation and/or the erosion operation at times.

For example, a conventional identification algorithm can process the picture data set linewise. In this case, it can be sufficient if only the gray scale values of the picture elements contained in this line are subjected to the dilation operation and/or the erosion operation and, for this purpose, only these gray scale values and the gray scale values of the two adjacent image point lines are temporarily observed.

As an alternative to this, however, it is possible, starting from the original image data set maintained in unchanged form, ultimately to generate a complete copy of the image data set for every picture element by carrying out a dilation operation and/or an erosion operation, the copy being modified with respect to the original image data set due to the operations carried out.

It is preferred for the dilation operation and/or the erosion operation to be generally carried out for all picture elements of the image data set. This does not, however, necessarily apply to the outer picture elements, that is, to the picture elements of the marginal regions of the image information. For these picture elements, or the corresponding gray scale values, the dilation operation and/or the erosion operation can be dispensed with or only a limited environment of picture elements is used as the basis for the respective operation.

Regarding the actual carrying out of the dilation operation, the environment, that is, the adjacent picture elements, is preferably examined for the picture element in question as to which value the darkest gray scale value of this environment has. The gray scale value identified on the basis of this check is then associated with the picture element in question. In other words, the minimal or maximal gray scale value is looked for—depending on the definition—and used as the basis for the further processing of the picture element in question. This procedure therefore has the result that dark regions are enlarged pixel by pixel and adjacent code element structures are thus optionally changed into contiguous structures.

A so-called 9 point environment 12 (see FIG. 4*c*) can in particular be considered for the environment, that is, for an orthogonal pattern of picture elements, the eight picture elements surrounding the picture element in question. This environment observation can thus also be considered as using a filter core or a conversion mask.

The procedure is also carried out in a corresponding manner for the performance of the erosion operation. Here, the environment of the picture element in question is examined for the lightest gray scale value in order to take over this gray scale value for the picture element in question and thus to enlarge or bring together structures of light code elements.

In a further development of the invention, it is not the darkest value which is looked for and associated with the picture element in question for the dilation operation, but the second darkest or the third darkest. This ultimately corresponds to a median filtering and produces particularly good results with images with comparatively high noise or interference.

Whether the second darkest or the third darkest, or even a higher value criterion, is worked with here ultimately depends on how strong the noise in the image information is and on how large the underlying picture element environment and the original graduation of the gray scale values (bit number) are.

This further development of the invention can also be transferred without problems to the erosion operation; i.e. the second lightest or third lightest gray scale value can also be looked for here and associated with the picture element in question.

It is preferred for only the dilation operation to be carried out on the presence of a light background code, that is, of a code with which dark code elements are applied or stamped into a light background. It is preferred in a corresponding manner for a dark background code only to be subjected to an erosion operation. Whether ultimately the dilation operation or the erosion operation should be carried out can be predetermined or decided in the framework of the code recognition process, for example by a trial and error process.

The invention will be explained in the following by way of example with reference to the drawings.

BRIEF DESCRIPTION OF THE DRAWINGS

FIGS. 3*a* and 3*b* show the code or the L pattern in accordance with FIG. 2*a* and FIG. 2*b* after dilation;

FIGS. 4*a*, 4*b* and 4*c* show further processing steps after successful identification of the L pattern; and FIGS. 5*a* and 5*b* show an inverted code before or after erosion respectively.

DESCRIPTION OF THE PREFERRED EMBODIMENTS

Figure 1A:
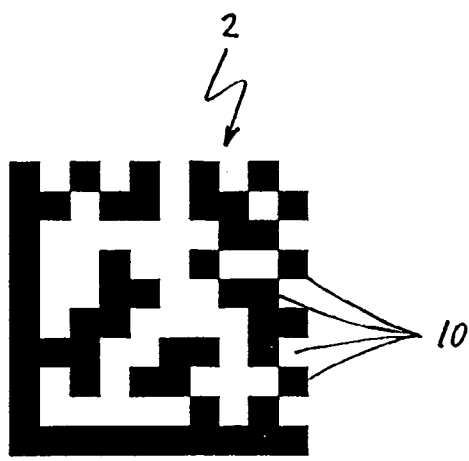
FIGS. 1*a*, 1*b* and 1*c* show a code in good print quality, its L pattern or its whole reference pattern.

FIG. 1*a* shows a two-dimensional code of the "Datamatrix" kind, which is available in good print quality. This code consists of a chessboard-like pattern of light and dark, substantially square code elements with information being encoded by their arrangement.

The code or image data 2 shown in FIG. 1*a* contains a reference pattern 4 which is pre-set by a predetermined arrangement of the code elements in question and serves for the localization of the code within an image environment and for the identification of the code kind. This reference pattern is shown in isolation in FIG. 1*c*. It consists of a so-called L pattern 6, on the one hand, which has two solid limbs arranged perpendicular to one another of the substantially square outline of the code and is shown separately in FIG. 1*b*. The position and the angular arrangement of the code of the shown kind of code "Datamatrix" can be recognized within a picture environment using this L pattern.

On the other hand, the reference pattern in accordance with FIG. 1 shows a so-called timing pattern 8 which consists of an alternating sequence of light and dark code elements along two limbs of the square outline of the code arranged perpendicular to one another. This timing pattern prescribes the pixel measure, in which the chessboard-like arrangement of the further code elements is to be expected, for the further identification steps with respect to the code type "Datamatrix".

Figure 1B:
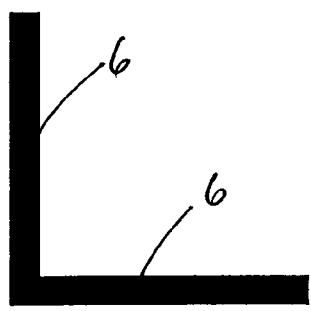
Figure 1C:
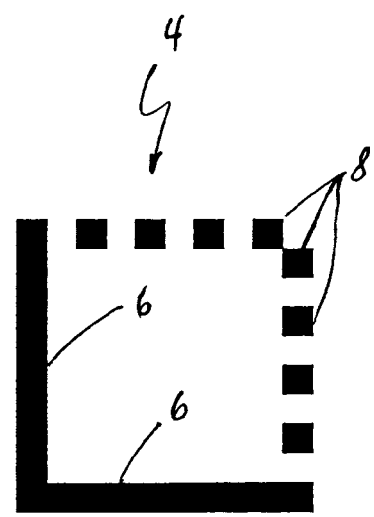
Figure 2A:
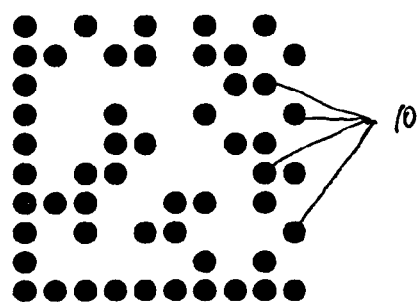
FIGS. 2*a* and 2*b* show this code or this L pattern on manufacture in a direct marking process.
Figure 2B:
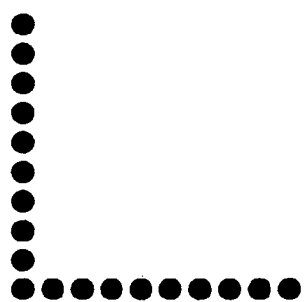

FIG. 2*a* shows the appearance of the code in accordance with FIG. 1 if this has been manufactured in accordance with a direct marking process, in particular by a punching process. The individual dark code elements are not continuously connected to one another with this manufacturing method, but are always separated from one another by webs. This is shown for the L pattern in FIG. 2*b*.

This circumstance can create problems particularly for the code recognition step of the first identification of the code with reference to its L pattern. The usually used identification algorithms require that the L pattern appears as a solid line as is shown in FIG. 1*b*, in contrast to FIG. 2*b*.

This problem is eliminated in accordance with the invention in that the image data set 2 which contains the information reproduced in FIG. 2*a* is subjected to a dilation operation for each picture element 10. FIG. 3*a* shows dilated code 14, which is how code 10 in accordance with FIG. 2*a* appears if a dilation operation has been carried out for each picture element of this code. The corresponding appearance of the L pattern 6 of this code is illustrated in FIG. 3*b*.

It can be recognized from FIG. 3*b* that the identification of the L pattern can take place without problem using the modified image data set in accordance with FIG. 3*a*, since the dark code elements in question now appear as a contiguous structure. The further usual code recognition steps can thereby be subsequently carried out, and indeed with reference to the original image data set in accordance with FIG. 2*a* and/or with reference to the modified image date set in accordance with FIG. 3*a*.

A preferred procedure for the recognition and decoding of the code in accordance with FIG. 2*a* will be explained in the following.

First, the code in accordance with FIG. 2*a* as well as an image environment which surrounds this code, and is not shown in FIG. 2*a*, is read in, that is, converted into electronic received signals, by means of an optoelectronic sensor which detects a plurality of picture elements 10. This image information is available, for example, in an 8 bit graduation, that is, in a graduation of 256 different gray scale values.

A binarization step is carried out next. A decision is therefore made with reference to a predetermined threshold as to whether the gray scale value determined for a specific picture element is to be associated with a dark value (black) or a light value (white). After this binarization step, the image data set corresponds to the representation in accordance with FIG. 2a. The gray value information is available only in two different graduations.

After the binarization step, a dilation operation is carried out for all picture elements 10—and thus for all code elements to be identified subsequently. For this purpose, the respective gray values of all eight directly adjacent picture elements are examined for the darkest gray scale value for an observed picture element and this darkest gray scale value is associated with the observed picture element. This ultimately results in an enlargement, and optionally in a fusion of the dark regions of the code, as shown in FIGS. 3a and 3b. The explained association of the respectively darkest gray scale value with the observed picture element can take place within a copy of the original image data set so that therefore the image information is ultimately available in accordance with FIGS. 3a and 3b as a separate, modified image data set.

These dilation operations can be carried out in a separate run for all picture elements. Alternatively to this, the dilation operation for the respective picture element can—as already explained—be carried out implicitly during a further code recognition step, in particular during the working through of an algorithm for the recognition of the L pattern.

The following code recognition steps are still carried out after, or during, the carrying out of the dilation operation:
- the L pattern 6 is identified; this step is carried out on the basis of the dilated image information (FIG. 3b);
- the timing pattern 8 of the code is identified by means of a corresponding recognition algorithm; for this purpose use is preferably made of the binarized, non-dilated image data set (FIG. 4a);
- the bit matrix, that is, the pattern of the light and dark code elements, is identified on the basis of the recognized L pattern and of the timing pattern, so that now all picture elements have been associated with a respective code element (FIGS. 4b and 4c;
- finally, the decoding of this bit matrix can take place in order to obtain the information encoded in the code.

It must be noted with respect to the explained procedure that the binarization can also take place only after the dilation operation. This can in particular be of advantage with pictures having noise or interference if—as already explained—the dilation operation should not take place using the darkest gray scale value, but using the second darkest or third darkest gray scale value and if, for this purpose, all originally determined graduations of the gray scale values should be known.

It is also possible to dispense with a separate binarization step if the sensor used supplies only two different gray values anyway and thus already implicitly carries out the threshold comparison.

It must finally be noted that the explained method can be transferred without problem to so-called inverted codes, that is, to codes with which light code elements appear in front of a dark background. This is shown in FIG. 5a for a code in accordance with a direct marking method or in FIG. 5b after carrying out an erosion operation for all picture elements of this code. With this erosion operation, a comparison of the gray scale values of the adjacent picture elements is carried out with respect to the lightest gray scale value in order to associate this lightest gray scale value with the observed picture element.

It must moreover be noted that the method in accordance with the invention can also be used with all other one-dimensional or two-dimensional codes. This relates in particular to those codes which are provided with a predetermined reference pattern, for example with concentric circles with the code type "Maxicode".

The invention claimed is:

1. A method of recognizing a code composed of code elements which is encoded within an image data set which contains a respective piece of information on a gray scale value for each of a plurality of picture elements,
   wherein at least one dilation operation and/or erosion operation is carried out on the image data set only with respect to the identification of a reference pattern portion contained in the code or of a part of the reference pattern portion, and
   wherein the reference pattern portion comprises a predetermined arrangement of code elements characterizing an arrangement or a kind of code.

2. A method in accordance with claim 1, wherein the identification of the timing pattern of the code, the binarization of the gray scale value and/or the decoding of the image data set is carried out using the original image data set.

3. A method in accordance with claim 1, wherein the dilation operation and/or the erosion operation is carried out for all picture elements of the image data set.

4. A method in accordance with claim 1, wherein, for the carrying out of the dilation operation for a picture element, an environment of the picture element is examined with respect to the darkest, the second darkest or the third darkest gray scale value; and in that this gray scale value is associated with the picture element in question.

5. A method according to claim 4 wherein the environment of the picture element is a 9 point environment.

6. A method in accordance with claim 1, wherein, for the carrying out of the erosion operation for a picture element, an environment of the picture element is examined with respect to the lightest, the second lightest or the third lightest gray scale value; and in that this gray scale value is associated with the picture element in question.

7. A method according to claim 6 wherein the environment of the picture element is a 9 point environment.

8. A method in accordance with claim 1, wherein, when a light background code is present, only the dilation operation is carried out and/or, when a dark background code is present, only the erosion operation is carried out.

9. A method in accordance with claim 1, wherein the gray scale values are present in a graduation of a plurality of bits, in particular of eight bits; or in that the gray scale values are binary values.

10. A method in accordance with claim 1, wherein the image data set is produced by means of an optoelectronic sensor, in particular of a CCD or CMOS receiver.

11. A method according to claim 10 wherein the optoelectronic sensor is one of a CCD and a CMOS receiver.

12. A method in accordance with claim 1, wherein the code is a one-dimensional code or a two-dimensional code.

13. A method according to claim 12 wherein the one-dimensional code is a bar code.

14. A method according to claim 12 wherein the two-dimensional code is one of a Maxicode, Datamatrix, QR, PDR 417 and MicroPDF 417.

15. A method according to claim 1 wherein the at least one dilation operation and/or erosion operation is carried with respect to the identification of a finder pattern of the code or of a part of the finder pattern.

16. A method of recognizing a code composed of code elements which is encoded within an image data set which contains a respective piece of information on a gray scale value for each of a plurality of picture elements, wherein at least one dilation operation and/or erosion operation is carried out on the image data set during an identification of a reference pattern portion contained in the code or of a part of the reference pattern portion, and wherein the reference pattern portion comprises a predetermined arrangement of coder elements characterizing an arrangement or a kind of code.

17. A method in accordance with claim 16, wherein the dilation operation and/or the erosion operation is carried out implicitly, namely in that the gray scale values observed during the working through of an identification algorithm are temporarily subjected to the dilation operation and/or the erosion operation.

18. A method in accordance with claim 16, wherein the allocation of the gray scale value takes place inside a copy of the image data set.

* * * * *